United States Patent
Pawelski

[19]

[11] Patent Number: 5,822,386
[45] Date of Patent: Oct. 13, 1998

[54] PHASE RECOVERY CIRCUIT FOR HIGH SPEED AND HIGH DENSITY APPLICATIONS

[75] Inventor: Robert Lee Pawelski, Lisle, Ill.

[73] Assignee: Lucent Technologies Inc., Murray Hill, N.J.

[21] Appl. No.: 564,699

[22] Filed: Nov. 29, 1995

[51] Int. Cl.[6] ........................................ H03D 3/24
[52] U.S. Cl. .................... 375/373; 324/147; 370/516
[58] Field of Search .................. 375/371, 373, 375/375, 376, 377; 371/62; 327/147; 370/516, 517, 518, 519

[56] References Cited

U.S. PATENT DOCUMENTS

| | | |
|---|---|---|
| 4,625,320 | 11/1986 | Butcher . |
| 4,667,333 | 5/1987 | Butcher . |
| 4,841,551 | 6/1989 | Avaneas .................................. 375/373 |
| 5,022,056 | 6/1991 | Henderson et al. ..................... 375/373 |
| 5,349,612 | 9/1994 | Guo et al. . |

OTHER PUBLICATIONS

W. T. Greer, Jr. et al., "Digital Phase–Locked Loops Move Into Analog Territory", *Electronic Design*, Mar. 31, 1982, pp. 95–100.

*Primary Examiner*—Wellington Chin
*Assistant Examiner*—Jean B. Corrielus
*Attorney, Agent, or Firm*—Dennis J. Williamson

[57] ABSTRACT

A phase recovery circuit consists of a tapped delay line created by a string of inverters where taps are taken at every other inverter. To initialize the circuit, each tap loads a signal sample into a holding register where the holding register consists of a flip-flop connected to each tap. The flip-flops are loaded by the active edges of the system clock such that each flip-flop contains a sample of data at a given point in time. The sample register delivers the data to a processor that periodically creates histograms of the signal to determine the signal transition points between adjacent bits and the number of taps between the transition points that define a bit. Once the transition points are known, the center of the bit to be latched is located and the tap nearest the center of the bit is used to latch the data for delivery to the next downstream location. From the histograms the processor can also determine if the signal is shifting relative to the system clock. If the signal shifts, the processor selects another tap, located nearest the new location of the center of the bit, and latches the data from the new tap. The system also uses an elastic store downstream from the tapped delay line to preclude the need for an extremely long delay time which would cause signal degradation

16 Claims, 5 Drawing Sheets

PHASE RECOVERY CIRCUIT FOR HIGH SPEED AND HIGH DENSITY APPLICATIONS

BACKGROUND OF THE INVENTION

The invention relates, generally, to a phase recovery circuit and, more particularly, to a phase recovery circuit that compensates for dynamic delay in high speed and high density digital applications.

It will be appreciated that in digital signal transmission systems such as telecommunications systems, computer networks or the like it is desirable to increase system throughput (i.e the speed at which signals or bits can be transmitted through a system). System throughput can be increased either spatially, such as by providing more transmission members, or temporally by increasing the speed at which the signals are transmitted over the transmission members. It will be understood that increasing throughput spatially, while relatively simple technically, comes at an increase in cost due to the use of additional hardware. Increasing speed temporally is more technically difficult to achieve yet ultimately results in lower cost systems. Therefore, it is desirable to increase throughput speed temporally whenever possible.

One problem associated with increasing throughput temporally is that as the transmission speed increases, data paths incur a greater proportion of delay relative to the bit period. One type of delay, known as dynamic delay, results from variations over time in power supply voltages, temperature and other variable environmental factors. The result of such delay is that over time the signal may shift out of phase relative to the system clock such that errors in the transmission of data will occur. It also will be appreciated that for transmission purposes it is desirable to latch onto a bit near the center of the bit to avoid metastability because the edges of adjacent bits having different values have non-ideal rise and fall times. As a signal's phase shifts, the edge of the bit moves towards the latch device such that errors in transmission can occur even where the signal is not completely out of phase. Because the dynamic variations that cause delay are not constant over time, it is necessary to continuously monitor the phase of the signal and regularly compensate for any phase shift that occurs.

It will be appreciated that in high speed, digital transmission systems, such as found in telecommunications switching systems where large number of data paths converge, phase recovery is not easily accomplished. Existing analog techniques require extremely tight tolerances to operate at high speeds and are not readily implemented for high speed, high density applications.

Thus, a problem in the art exists in that a simple and effective phase recovery circuit for high speed, high density digital transmission systems does not exist.

SUMMARY OF THE INVENTION

The phase recovery circuit of the invention solves the above-noted problems and consists of a tapped delay line created by a string of inverters where taps are taken at every other inverter. Dual inverters are used to null any differences of proportion delay for high to low versus low to high signal transitions. To initialize the circuit, each tap loads a signal sample into a holding register where the holding register consists of a flip-flop connected to each tap. The flip-flops are loaded by the active edges of the system clock such that each flip-flop contains a sample of data at a given point in time. The samples are taken continuously as data is transmitted through the system and are delivered from the holding register to a sample register. The sample register delivers the data to a processor that periodically creates histograms of the signal sampled on the tapped delay line. From these histograms the signal transition points between adjacent bits and the number of taps between the transition points that define a bit (the "valid taps") can be determined. Once the transition points are known, the center of the bit to be latched is located and the tap nearest the center of the bit is used to latch the data for delivery to the next downstream location. From the histograms the processor can also determine if the signal is shifting relative to the system clock. If the signal shifts, the processor selects another tap, located neatest the new location of the center of the bit, and latches the data from the new tap. In this manner, data can be latched from the center of the bit even as the phase of the signal shifts. The system also uses an elastic store downstream from the tapped delay line to preclude the need for an extremely long delay line which would cause signal degradation. The elastic store normally loads one bit and unloads one bit for each clock cycle. When the tap is changed from the last valid tap to the first valid tap (indicating that the signal has positively shifted by half a bit period), two consecutive bits are loaded simultaneously into the elastic store for that clock cycle to prevent the loss of a bit resulting from the change in taps. Conversely, when the tap is changed from the first valid tap to the last valid tap (indicating that the signal has negatively shifted by half a bit period), no bits are loaded into the elastic store for that clock cycle to prevent the transmission of the same bit twice.

DETAILED DESCRIPTION

Figure 1:
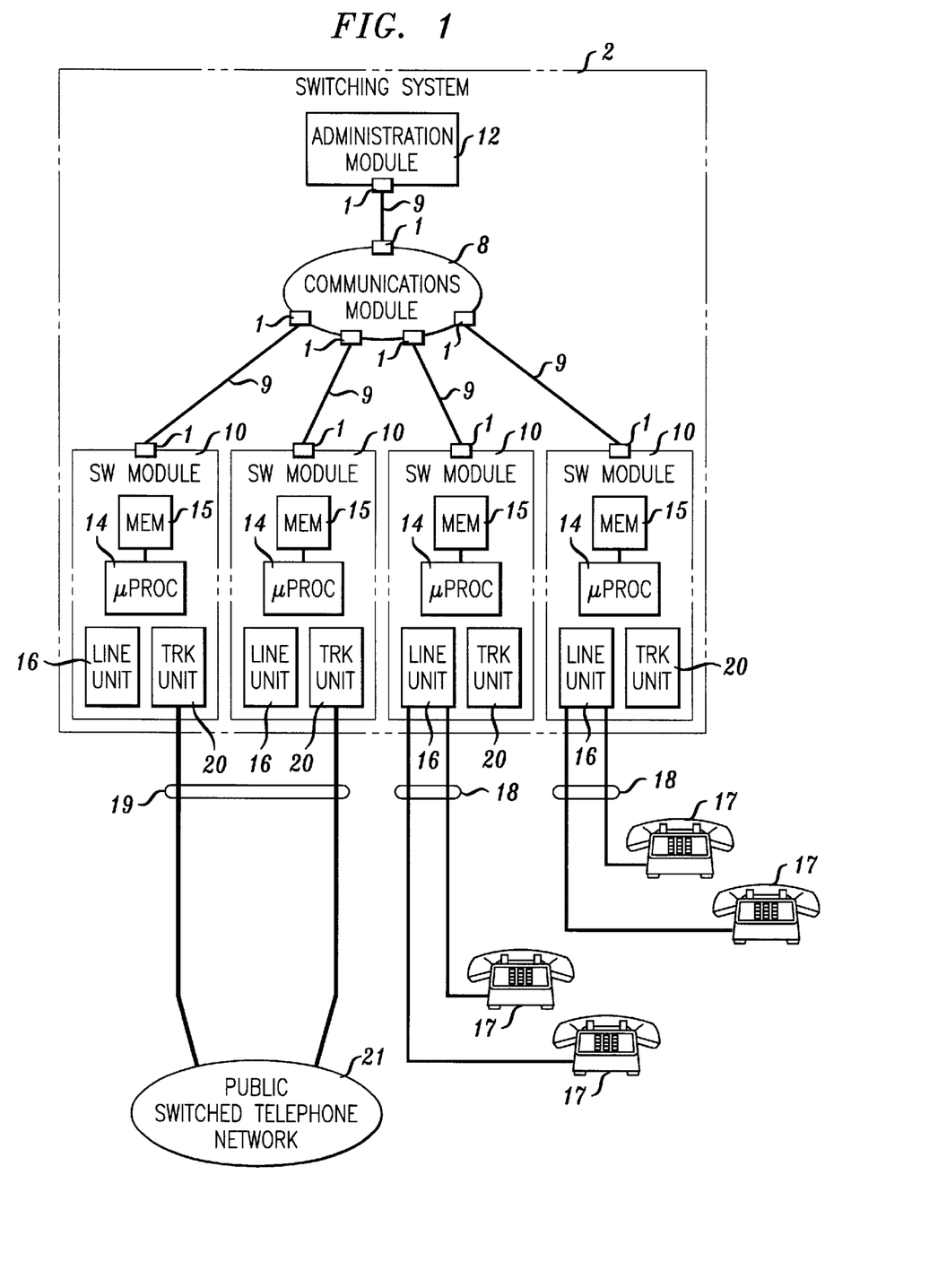
FIG. 1 is a block diagram showing the circuit of the invention in a telecommunications switching system.

Referring more particularly to FIG. 1, an exemplary configuration of a switching system commonly found in a telecommunications system is shown in which the circuit of the invention may be used. One such switching system in the 5ESS® family of switching systems manufactured and sold by AT&T and described in U.S. Pat. No. 4,592,048 issued to Beckner et al. on May 27, 1986 and in AT&T Technical Journal, Volume 64, No. 6, part 2, pp. 1205–1524, or any other suitable switching system. Switching system 2 operates as is well known in the art to switch voice and data through the network. The architecture of one such switching system is shown and includes a communication module 8 forming a hub and having a plurality of switch modules 10, and an administration module 12 connected thereto by transmission members 9 such as optical links. Each switch module 10 is controlled by processor 14 and associated memory 15 and provides call processing, time division switching, and signaling for the lines and trunks to which it is connected. Each switch module includes line units 16 that provide interface to the local loops 18 that connect to the customer premise equipment 17 and trunk units 20 that provide interface to the trunks 19 that connect to other switches in the public switched telephone network (PSTN) 21. The administration module 12 provides functions that can be centralized such as maintenance control, craft interface, text and data base management, call routing and time slot allocation. The administration module 12 consists of a control unit such as the AT&T 3B21D duplex processor and a main memory. In some switching systems, the administration module is assisted by a separate processor that performs some administrative functions. Communication module 8 is the hub of the switching system and allows communication between the administration module 12 and the switch modules 10. Communication module 8 consists of a message switch that provides the administration module-to-switch module and switch module-to-switch module message communication, and a time multiplexed switch providing the switch module-to-switch module and switch module-to-administration module time slot connection for voice and data communication and clock and frame reference distribution.

The phase recovery circuit of the invention is located at any point in the system where signals are transmitted from one device to a second device where the phase of the signal can affect transmission accuracy. In the illustrated embodiment, the phase recovery circuits of the invention, shown generally at 1, are located at the interface between transmission members 9 and switch modules 10 and communications module 8. It will be appreciated that the circuit of the invention can be located anywhere in the data transmission stream such as the interface between the trunks 19 and switch modules 12 or the like and that it has applicability to data transmission systems other than switched telecommunication networks.

Figure 2:
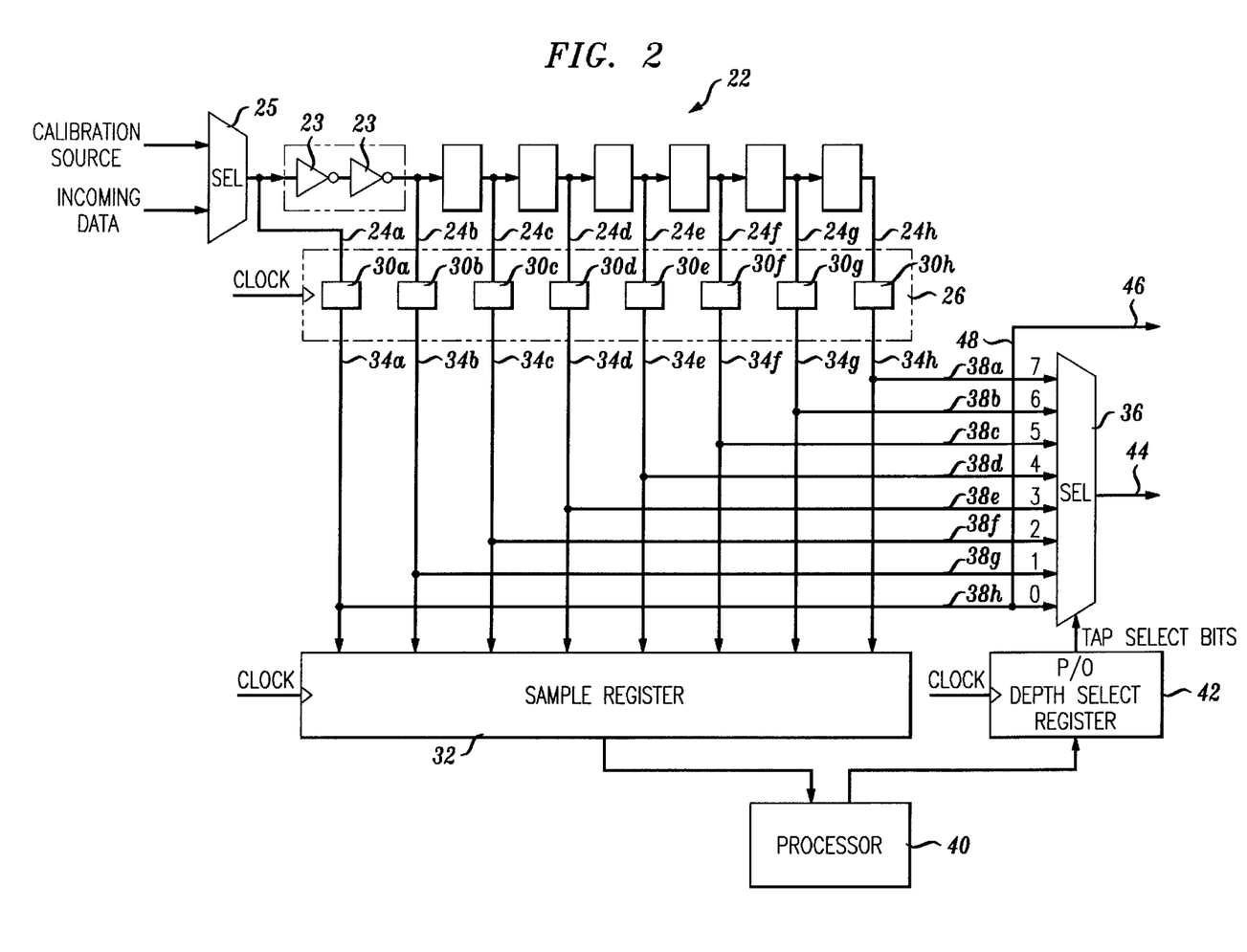
FIG. 2 shows the fractional bit phase adjustment circuit of the invention.

Referring more particularly to FIG. 2, the fractional bit phase adjustment portion of circuit 1 is shown including a delay line 22 consisting of a plurality of inverters 23 arranged in series. A selector 25 is provided to calibrate the incoming data relative to a calibration source such as the system clock. Taps 24a through 24h receive data from delay line 22 and are located after every other inverter to maintain the symmetry of the data transitions.

The taps 24a through 24h sample the data transmitted over delay line 22 on the same clock cycle such that the samples represent the signal transmitted over delay line 22 at a given point in time. The delay line 22 is configured to be long enough to hold an entire bit for the fastest processing times yet still have at least three taps per bit for the slowest processing times to provide reliability in the signal sampling process as will be hereinafter described. Processing time as used above refers to the variations in processing speeds for different integrated chip manufacturers under the range of encountered environmental conditions. The application in which the circuit of the invention is used determines the frequency (or speed) of the signal and, therefore, the length of delay line 22 and is independent of the invention. In one illustrative embodiment, if operating clock frequencies of 500–700 MHZ and Gallium Arsenide (GaAs) Direct Coupled FET Logic is used, eight taps are required for the fastest process and three taps are required for the slowest process. The actual number of taps to be used for a given application is determined by the calibration process performed at the initialization of the system as will hereinafter be described. Other operating frequencies and logic may require a fewer or greater number of taps.

Each of taps 24a through 24h are connected to a holding register 26 where the holding register includes flip-flops 30a through 30h connected to taps 24a through 24h, respectively, for storing the data received from the taps. All of the flip-flops 30a through 30h are loaded by the active edge of the clock and will contain a sample of the data at a given point in time. The output from each of flip-flops 30a through 30h is delivered from holding register 26 to sample register 32 over lines 34a through 34h and from lines 34a through 34h to selector 36 over lines 38a through 38h. Sample register 32 delivers the signal samples from each of lines 34a through 34h to processor 40 every clock period. Processor 40 accumulates the samples for a predetermined number of periods (i.e 100) and creates a histogram representative of the signal on the delay line 22 as is known in the art. It will be understood that sampling theory requires that a signal must be sampled at at least twice the frequency of the frequency of the signal in order to achieve reliable signal reconstruction. Because the frequency at which samples can be taken is limited by existing technology, in the circuit of the invention, the signal is delayed or slowed down by the inverters 23 in delay line 22 such that a plurality of samples of each bit can be taken. Based on the histogram, the processor 40 can determine the transition points between adjacent bits and can determine the taps nearest the transition points.

To calibrate the circuit a calibration source sends a calibration signal consisting of an alternating stream of ones and zeros, generated by the system clock, into the delay line 22 via selector 23. Several samples are taken as described above to determine the location of the transition points of this stream. The number of taps between the transition points indicates how many taps are valid per bit (i.e. the valid taps). The processor uses this information to determine the last allowable tap to use before switching back to the first tap when the signal is positively shifting in phase, and conversely, which tap to switch to when the signal has negatively shifted in phase beyond the first tap. The processor 40, based on this analysis, sets depth select register 42 such that the tap located nearest the center of the bit (i.e. the tap located midway between the transition points of the signal) is connected to output tap 44 by selector 36 to transmit the data downstream. Moreover, the signal from tap 24a is always delivered to secondary output tap 46 via lines 34a, 38a and 48 such that this data sample is always available for transmission downstream.

Figure 4:
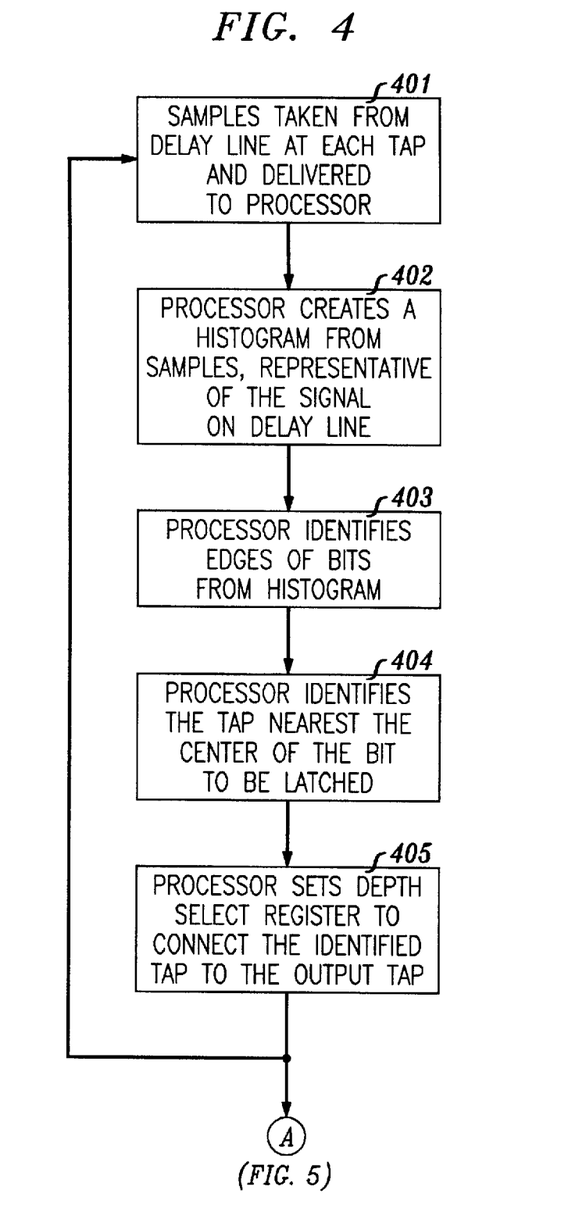
FIGS. 4 and 5 are block diagrams showing the method of operation of the phase recovery circuit of the invention.

Operation of the fractional bit phase adjustment circuit of FIG. 2 will now be described with reference to the flow diagram of FIG. 4. To initialize the circuit, samples are taken at each tap 24a through 24h and are delivered to processor 40 via holding register 26 and sample register 32 (block 401). The samples can be taken every clock period or as otherwise designated by processor 40. Processor 40 accumulates a predetermined number of samples and creates a histogram representative of the position of the bits along delay line 22 (block 402). It will be appreciated that the bits can have a value of either 1 or 0 and that between adjacent bits having different values transition areas will occur where the signal makes a transition from one value (i.e. 1) to the other value (i.e. 0). Any samples taken where adjacent bits have the same value are discarded. The processor 40, by analyzing the histogram created from a number of samples, can identify where along the delay line 22 those transition areas are occurring (block 403). Assume that from the calibration process described above that processor 40 has identified five valid taps per bit. Thus, taps 24a through 24e (five taps starting with tap 24a) are selected as the valid taps for the signal. The processor 40 identifies the signal transitions from the histogram and determines the center of the bit. Assume for explanatory purposes that the processor determines that the transitions are dominant at tap 24e and that the center of the bit is found at tap 24b (block 404). Processor 40 sets depth selector register 42 such that selector 44 connects tap 24b to output tap 44 via lines 34b and 38b (block 405). Thus, the portion of the signal nearest the center of the bit, and farthest away from the metastable edges of the bit, is latched and transmitted downstream at output tap 44. It will be appreciated that where an even number of valid taps define a bit, the center of the bit will fall at or near the selected tap, where odd number of valid taps define a bit, the center of the bit will fall midway between the taps such that either of the two taps nearest the center of the bit can be selected.

As previously explained, the phase of the signal can dynamically shift due to temperature, power supply voltages and the like. As a result of this shift, the center of the latched bit may move from the selected tap where the extent of shift is not consistent or predictable. Thus, after initialization of the device, it is necessary to continue to sample the signal on an ongoing basis during data transmission. As data is transmitted, the processor 40, via holding register 26 and sample register 32, continues to sample the data on a regular basis, accumulates the samples and creates periodic histograms. If the histograms indicate a shift of the transition points of the signal, the processor 40 knows that the center of the bit is also shifting. In response, the processor 40 can change the setting of depth selector register 42 to connect to the tap located nearest the new position of the center of the bit whenever it is determined that the center of the bit has shifted closer to another tap. In this manner, the phase adjustment circuit of the invention consistently latches the center of the bit even if the signal shifts.

The selector 42 can be set to allow connection of output tap 44 to any tap within the group of valid taps (e.g. taps 24a through 24e for the preceding example); however, the selector output tap 44 is not connected to a tap outside of the group of valid taps. Thus, when a tap must be increased beyond the last valid tap due to a positive phase shift, the processor must revert to select the first valid tap (tap 24a). This indicates that the phase of the signal has shifted an entire bit in the delay line such that the first valid tap (tap 24a) will actually be sampling the succeeding bit in the data stream, resulting in a loss of a bit. Likewise, if phase shift moves in the opposite direction to the point where the tap must be decreased beyond the first valid tap and the tap must jump to the last valid tap, the same bit will be clocked in twice. Both the loss of a bit and the double clocking of a bit are obviously undesirable scenarios.

One solution is to increase the length of delay line 22 such that the delay line is long enough to accommodate larger phase changes and it is not necessary either to revert from the last valid tap to the first valid tap or to jump from the first valid tap to the last valid tap. While such a solution eliminates the loss or duplication of a bit, the use of additional inverters in the delay line may degrade the signal integrity near the end of the delay line. Moreover, increasing the length of the delay line increases the number of flip-flops and the complexity of the select logic.

Figure 3:
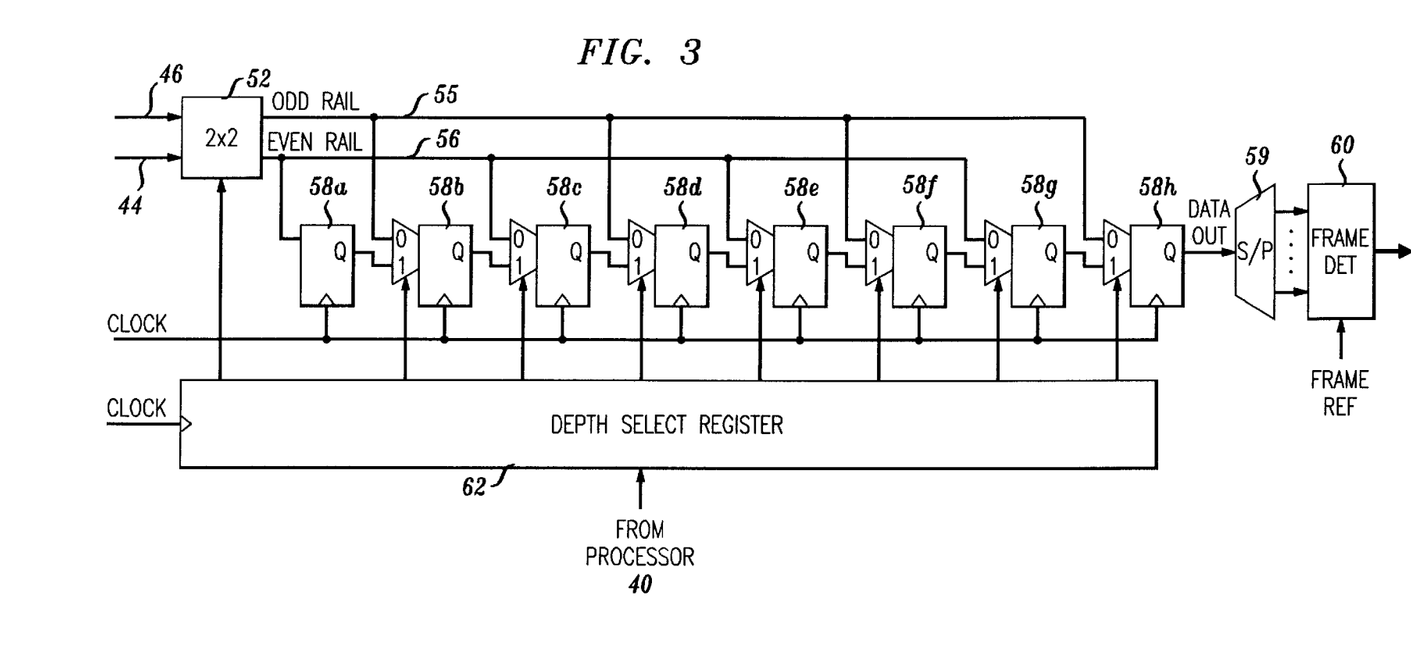
FIG. 3 shows the elastic store circuit of the invention.

To avoid these problems the system of the invention uses the elastic store shown in FIG. 3, in conjunction with the fractional phase bit adjustment circuit of FIG. 2. Specifically, the elastic store of the invention includes a 2×2 switch matrix 52 that can connect the output tap 44 and the secondary output tap 46, described with reference to FIG. 2, to either the odd rail 55 or even rail 56. Switch 52 is configured to pass output tap 44 to even rail 56. A series of flip-flops 58a through 58h are connected in series with one another with the output of each flip-flop connected to one of the two inputs of the adjacent flip-flop. The even rail 56 and odd rail 55 are connected to the remaining inputs of alternating ones of the flip-flops. The output of the last flip-flop 58h is connected to a frame detector 60 via serial to parallel converter 59 for detecting a predetermined bit framing pattern and the output of the frame detector is delivered to a use device such as a switch, transmission member or the like. The inputs for each flip-flop and the position of switch matrix 52 are controlled by depth select register 62 under the control of processor 40.

At initialization, the last four flip-flops 58e to 58h are used to deliver data from the even rail 56 to the frame detector 60. Specifically, each of flip-flops 58f through 58h are set with input 1 receiving data from the adjacent flip-flop. Switch 52 is configured to pass output tap 44 to even rail 56. Flip-flop 58e is set with input 0 receiving data from even rail 56 and flip-flops 58a through 58d are set to input 0. Thus, the data from output tap 44 from the fractional bit phase adjustment circuit shown in FIG. 2 is transmitted through the last four flip-flops 58e through 58h to frame detector 60. Data from the secondary output tap 46 is loaded into flip-flop 58d but is not passed to the output (because the input of flip-flop 58e is connected to even rail 56).

To initialize the elastic store, processor 40 initializes the circuit of FIG. 2 as described above such that a valid bit stream is available on output tap 44. The bit stream is delivered to serial to parallel converter 59 where it is converted into words that contain a framing pattern. Frame detector 60 examines each frame of data as it is transmitted on each clock cycle looking for a recognizable framing pattern aligned with the local frame reference. It will be appreciated that the framing pattern defines the beginning of a word of information for the particular communication standard used by the system. If no recognizable framing pattern is detected, processor 40 either adds or removes a flip-flop to the original series of flip-flops 58e through 58h. It will be appreciated that as the signal passes through each of the flip-flops in the series, it is delayed slightly such that the addition or subtraction of flip-flops in the series will change the amount of delay and will change the word boundaries. Thus, by properly adding and subtracting flip-flops, the processor 40 finely adjusts the frame of the signal relative to frame detector 60 until the signal is properly framed.

Once both the fractional bit phase adjustment circuit of FIG. 2 and the elastic store of FIG. 3 are initialized, the signal is phase adjusted and framed and can be properly transmitted. It will be appreciated that as the signal dynamically shifts phase, it will be necessary to compensate for the phase shift. The operation of the system to dynamically compensate for phase shift in an ongoing manner will now be described.

Referring to FIG. 2, assume that after initialization a valid bit is defined between taps 24a and 24f such that the center of the bit is at tap 24d. Selector 46 is set by processor 40 such that tap 24d is connected to output tap 44. Tap line 24a is permanently connected to secondary output tap 46 as previously described. Referring to FIG. 3, assume also that flip-flops 58f through 58h are set to input 1, flip-flop 58e is set to input 0, and switch matrix 52 connects odd rail 55 to secondary output 46 and even rail 56 to output 44. When configured as described, data is transferred from tap 24d, through selector 36 and switch matrix 52 onto the even rail 56 and through flip-flops 58e through 58h to the frame detector 60. Data is also delivered from secondary output 46 to the odd rail 55 but this signal does not flow to the frame detector 60. The circuit of the invention will maintain this configuration as long as there is no detected phase shift in the data signal.

As previously explained with reference to FIGS. 2 and 4, samples of the data stream are continuously taken by sample register 26 and are delivered to processor 40 for analysis. Processor 40 determines the location of the center of the bit being latched on an ongoing basis. Assume that this analysis shows that the bit is shifting to the right as viewed in FIG. 2. When analysis shows that the center of the bit has moved closer to tap 24e than tap 24d, the processor 40 will adjust select register 42 such that selector 36 connects tap 24e to output tap 44. The signal from tap line 24e is delivered to frame detector 60 via switch matrix 52, even rail 56 and the last four flip-flops 58e through 58h as previously described. On each clock cycle, flip-flop 58e will contain $bit_n$ (the bit being latched) and flip-flop 58d will contain $bit_{n+1}$ (the succeeding bit). $Bit_n$ will be transmitted to the frame detector 60 via the last four flip-flops, but $bit_{n+1}$ will not be transmitted from flip-flop 58d. This process will be repeated whenever the center of the bit shifts from the tap in use to a new tap until the new tap is outside of the valid taps (taps 24a through 24f).

Figure 5:
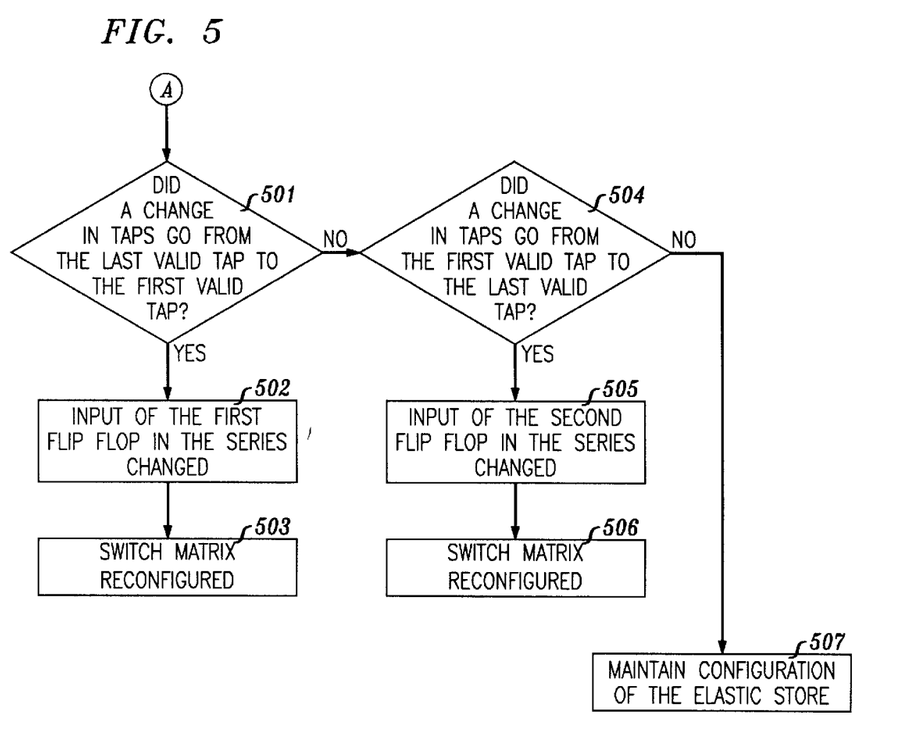

Referring to FIGS. 3 and 5, assume that processor 40 determines that a change in taps must revert from the last valid tap 24f back to the first valid tap 24a (block 501). In addition to reverting to the first valid tap (tap 24a), the input of flip-flop 58e, is changed from input 0 to input 1 (block 502) and switch matrix 52 is reconfigured to connect secondary output 46 to the even rail 56 and output 44 to the odd rail 55 (block 503). Thus, two bits ($bit_n$ and $bit_{n+1}$) are entered into the elastic store on that clock cycle, $bit_n$ from secondary output 46 via flip-flop 58a and $bit_{n+1}$ from output 44 via odd rail 55 and flip-flop 58d. On the next clock cycle data will flow from the output 44 to the odd rail 55 and be shifted by flip-flop 58d to the frame detector 60 in sequence through the last five flip-flops. Secondary output tap is connected, via the switch matrix 52, to the even rail 56 and to the flip-flop 58c but data does not flow to the frame detector 60. The elastic store maintains this configuration until the signal again shifts beyond the valid taps (block 507).

Assume that the processor 40 determines that the tap should be changed from the first valid tap (tap 24a) to the last valid tap (tap 24f) because the phase has shifted to the left as viewed in FIG. 2 (block 504). Also, assume that data is flowing to the use device via the last four flip-flops 58e through 58h. Processor 40 selects the last valid tap 24f using selector 36 shown in FIG. 1, and it simultaneously changes the depth select register 62 both to reconfigure switch matrix 52 such that output tap 44 is connected to the odd rail 55 and secondary output tap 46 is connected to the even rail 56 (block 506), and to change flip-flop 58f from input 1 to input 0 (block 505). Thus, no bits are entered into the elastic store on that clock cycle. On the next clock cycle, data, beginning with data $bit_n$, will be transmitted from the rightmost valid tap 24f via secondary output 46, to the odd rail 55 and to the frame detector 60 through the last 3 flip-flops. Secondary output 46 is now connected via the switch matrix 52 to the even rail 56 and to flip-flop 58e but does not flow to the frame detector. If the phase of the data continues to shift in the same direction, the process is repeated by changing the appropriate bits in the depth select register.

The circuit of the invention is capable of continuously monitoring and compensating for phase shift in high speed, high density digital applications. By using the fractional bit phase adjustment circuit in conjunction with the elastic store, the circuit of the invention can accommodate relatively large phase shifts in an efficient and cost-effective manner.

It is to be understood that the above description is only of one preferred embodiment of the invention. Numerous other arrangements may be devised by one skilled in the art without departing from the scope of the invention. The invention is thus limited only as defined in the accompanying claims.

The invention claimed is:

1. A phase recovery circuit comprising:
   a line for transmitting a signal and a plurality of taps for sampling the signal at different points on said line;
   means for selecting a particular one of said taps for latching onto said signal at one of said points on said line;
   means for identifying a portion of the signal to be latched; and
   means for controlling said means for selecting in response to said means for identifying such that the tap nearest the portion of the signal is selected;
   wherein said portion of the signal is transmitted to a use device via a variable number of flip-flops in series including means for delivering said portion of the signal to every other one of said flip-flops, and means for controlling the number of flip-flops in said series.

2. The phase recovery circuit of claim 1, said means for delivering including a means for switching and a plurality of outputs connected to said means for switching.

3. The phase recovery circuit of claim 1, wherein said flip-flops in series deliver said portion of the signal to a frame detector.

4. The phase recovery circuit of claim 1, wherein said signals comprise telecommunications signals in a switching system.

5. The phase recovery circuit of claim 1, wherein said line consists of a plurality of inverters, said taps being connected at every other inverter.

6. The phase recovery circuit of claim 1, wherein one of said plurality of taps is connected to a secondary output, the remaining ones of said taps being connected to another output via said means for selecting such that one of said remaining ones of said taps is connected to said another output.

7. The phase recovery circuit of claim 1, wherein said means for identifying includes means for sampling said signal and identifying the transition points of said signal.

8. The phase recovery circuit of claim 1, wherein the means for controlling the flip-flops includes means for adding and subtracting flip-flops to said series in response to the means for selecting.

9. The phase recovery circuit of claim 1, wherein the means for identifying identifies a subset of said plurality of taps as being valid for said portion of the signal, said subset being defined by a first valid tap and a last valid tap.

10. The phase recovery circuit of claim 9, wherein said means for controlling the number of flip-flops includes means for adding a flip-flop to said series when the selected tap changes from the last valid tap to the first valid tap.

11. The phase recovery circuit of claim 9, wherein said means for controlling the number of flip-flops includes means for subtracting a flip-flop from said series when the selected tap changes from the first valid tap to the last valid tap.

12. A method for compensating for signal shift in a communications system comprising the steps of:
   transmitting a signal;
   sampling the signal at different physical points;
   identifying a portion of the signal to be latched;
   latching onto the signal at the point closest to said portion;
   monitoring a shift in location of said portion;

latching onto the signal at a different point in response to said monitoring step;

transmitting said signal to a series of flip-flops; and adding or subtracting flip-flops to said series to frame said signal.

13. The method of claim 12, further including the step of identifying a subset of valid taps that define said portion, said subset being defined by a first valid tap and a second valid tap.

14. A phase recovery circuit comprising:

a line for transmitting a signal and a plurality of taps for sampling the signal at different points on said line;

means for selecting a particular one of said taps for latching onto said signal at one of said points on said line;

means for identifying a portion of the signal to be latched; and means for controlling said means for selecting in response to said means for identifying such that the tap nearest the portion of the signal is selected;

wherein said portion of the signal is transmitted to a use device via a variable number of flip-flops in series, and means for controlling the number of flip-flops in said series including means for adding and subtracting flip-flops to said series in response to the means for selecting.

15. A phase recovery circuit comprising:

a line for transmitting a signal and a plurality of taps for sampling the signal at different points on said line;

means for selecting a particular one of said taps for latching onto said signal at one of said points on said line;

means for identifying a portion of the signal to be latched by identifying a subset of said plurality of taps as being valid for said portion of the signal, said subset being defined by a first valid tap and a last valid tap; and means for controlling said means for selecting in response to said means for identifying such that the tap nearest the portion of the signal is selected;

wherein said portion of the signal is transmitted to a use device via a variable number of flip-flops in series, and means for controlling the number of flip-flops in said series.

16. A method for compensating for signal shift in a communications system comprising the steps of:

transmitting a signal;

sampling the signal at different physical points;

identifying a portion of the signal to be latched;

latching onto the signal at the point closest to said portion;

monitoring a shift in location of said portion;

latching onto the signal at a different point in response to said monitoring step;

transmitting said signal to a series of flip-flops, and identifying a subset of valid taps that define said portion, said subset being defined by a first valid tap and a second valid tap.

* * * * *